UNITED STATES PATENT OFFICE.

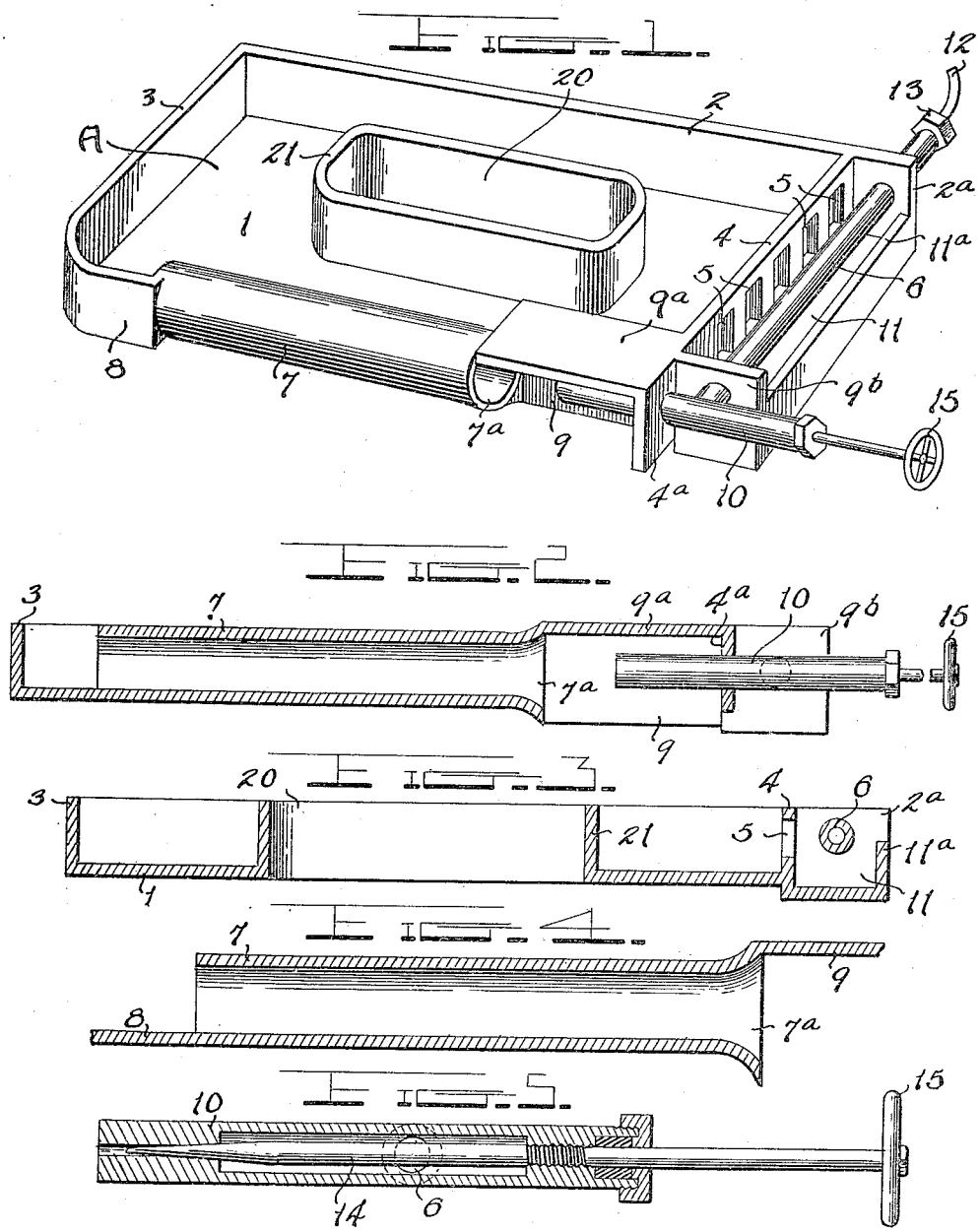

FLOYD J. JOHNSON, OF DULUTH, MINNESOTA.

KEROSENE-BURNER.

1,124,026.   Specification of Letters Patent.   Patented Jan. 5, 1915.

Application filed October 3, 1914. Serial No. 864,803.

*To all whom it may concern:*

Be it known that I, FLOYD J. JOHNSON, a citizen of the United States, residing at Duluth, in the county of St. Louis and State of Minnesota, have invented certain new and useful Improvements in Kerosene-Burners, of which the following is a specification.

The present invention relates to a kerosene burner attachment for heating and cooking stoves, and has for its object to provide a device of this character which embodies novel features of construction whereby the entire device, with the exception of the nozzle and needle valve, can be formed in one single casting, thereby eliminating expense in manufacture and producing a very durable construction.

A further object of the invention is to provide a device of this character which can be placed in the fire box of any stove so as to admit of oil being used as a fuel, which is simple and inexpensive in its construction, which can be easily started, and which will effectively vaporize kerosene and mix it with air so as to cause it to burn with a blue flame and produce a maximum amount of heat.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a kerosene oil burner constructed in accordance with the invention. Fig. 2 is a longitudinal sectional view taken on a line extending through the air mixing tube, the nozzle and needle valve construction appearing in side elevation. Fig. 3 is a longitudinal sectional view taken on a line extending through the central portion of the burner. Fig. 4 is a horizontal sectional view through the air mixing tube. Fig. 5 is a detail sectional view through the nozzle and needle valve, showing the same on an enlarged scale.

Corresponding and like parts are referred to in the following description and indicated in all the views of the drawing by the same reference characters.

In carrying out the invention the burner pan, generator pipe, air mixer and all parts of the device, with the exception of the nozzle and needle valve, are formed in one integral casting, thereby producing a strong and durable construction and eliminating the expensive item of fitting and assembling parts when manufacturing the device.

The reference character A designates the burner pan which is constructed in such a shape as to fit within the combustion chamber of the heating or cooking stove within which the burner is mounted. In the present instance this burner pan A is substantially rectangular in shape so as to fit within the combustion chamber of the usual cook stove.

The numeral 1 designates the flat bottom of the pan, 2 a wall at one side thereof, and 3 a wall at one end thereof. The end wall 4 which has an opposed relation to the end wall 3 is formed with a series of openings 5 through which the flame from the burner can play upon the generator pipe 6.

A horizontally and longitudinally disposed air mixing tube 7 is arranged at the side of the pan A opposite to the side wall 2 thereof, the inlet end of the said air mixing tube being slightly flared at 7ª. A side wall section 8 connects the discharge end of the air mixing tube 7 to the end wall 3, while a side wall section 9 connects the opposite end of the air mixing tube 7 to the end wall 4, the said side wall sections 8 and 9 being offset from each other and disposed so that the discharge end of the air mixing tube 7 communicates with the interior of the pan A, while the inlet end thereof opens upon the exterior of the said pan.

The end wall 4 projects upon one side of the pan, as indicated at 4ª, where it is formed with a suitable opening to receive the vapor discharge nozzle 10. A horizontal baffle wall 9ª connects the top of the inlet end of the air mixing tube 7 to the upper edges of the side wall section 9 and end wall extension 4ª so as to protect the discharge end of the nozzle 10 and inlet end of the mixing tube 7 from the action of the flame within the burner pan.

The generator pipe 6 is integral with and supported by an end extension 2ª of the side wall 2 and a corresponding extension 9ᵇ of the side wall section 9. Arranged under the generator pipe 6 is a trough 11 adapted to receive a quantity of alcohol when initially heating the generator to start the burner. This trough is preferably offset downwardly from the pan A and the outer side wall 11ᵃ thereof only extends partially up on the side wall extensions 2ᵃ and 9ᵇ so that access can be readily had to the generator tube and trough. One end of the generator tube 6 projects laterally beyond the side wall extension 2ᵃ and has an oil supply pipe 12 connected thereto by a suitable coupling 13, while the opposite end of the generator tube extends beyond the side wall extension 9ᵇ and is connected to one side of the nozzle 10. A needle valve 14 operates within the nozzle to control the discharge of vapor therefrom, said needle valve being operated in the usual manner by means of a suitable handle 15. All parts of the burner with the exception of the nozzle 10 are formed in one integral casting and this nozzle is merely inserted through the opening in the end wall extension 4ᵃ and brazed or otherwise suitably connected to the generator tube 6.

In order to start the burner a quantity of alcohol is placed in the trough 11 and ignited, the flame from the alcohol playing directly upon the generator tube 6 so as to heat the same and vaporize the oil therein. As soon as the oil is thus vaporized the needle valve 14 is opened to admit of the vapor being discharged in a jet from the nozzle 10, said jet of vapor entering the flared end 7ᵃ of the air mixing tube 7 and sucking air into the said tube therewith. During the passage through the tube the air and vaporized oil become thoroughly mixed so that upon being discharged into the burner pan A they burn with a blue flame. The stove structure within which the burner is placed will serve to confine the flame so that it will play through the openings 5 of the end wall 4 and act upon the generator tube 6 to heat the same and maintain it constantly at the necessary temperature after the burner has once been started. When placed within the firebox of a stove the device is designed to rest upon the grate thereof in such a manner that the space under the horizontal wall 9ᵃ and adjacent the flared end 7ᵃ of the air mixing tube 7 communicates downwardly with the ash pit from which air is drawn to supply the burner, while the burner pan itself is completely cut off from communication with the ash pit.

Under most circumstances it is found preferable to provide an elongated longitudinally disposed opening 20 at the center of the burner pan, said opening being surrounded by an upstanding flange 21 which has a height corresponding to that of the surrounding walls 2, 3, 4, 8 and 9 of the burner pan. The draft through this central opening 20 acts upon the blue flame from the burner so that the said blue flame is distributed evenly over the top of the burner instead of being drawn to one end or the other thereof by reason of a greater draft at one end of the burner than at the opposite end. A smooth uniform sheet of blue flame is thus obtained over the entire top of the burner, and owing to the fact that the generator pipe 6 is integral with the burner pan it will heat up quickly as the flame plays upon the metal so that after the burner has once been initially started there will be no difficulty in vaporizing the oil as it passes through the generator pipe.

Having thus described the invention, what I claim as new and desire to secure by Letters Patent, is:—

1. A kerosene burner for stoves including a burner pan, an integral air mixing tube extending along one side of the pan, an integral generator pipe extending along one end of the pan, an integral trough arranged under the generator pipe to receive combustible material when starting the burner, and a vapor nozzle attached to the generator pipe and arranged to discharge a jet into the air mixing tube.

2. A kerosene burner for stoves including a burner pan, an air mixing tube extending along one side of the pan and having the discharge end thereof in communication with the interior of the pan while the inlet end thereof opens on the exterior of the pan, a generator tube extending along one end of the burner pan and arranged at substantially right angles to the air mixing tube, a nozzle connected to the generator pipe and arranged to discharge a jet into the air mixing tube, and guard walls protecting the jet and inlet end of the air mixing tube from the flame of the burner.

3. A kerosene burner for stoves including a burner pan having one end wall thereof perforated and the adjacent ends of the side walls formed with extensions, a generator pipe connecting the side wall extensions and arranged opposite the perforations of the end wall, an air mixing tube extending along one side of the pan and having the discharge end thereof in communication with the interior of the pan while the opposite end thereof opens on the exterior of the pan, a nozzle connected to the generator pipe and arranged to discharge a jet into the air mixing tube, and guard walls protecting the jet and inlet end of the air mixing tube from the flame of the burner.

4. A kerosene burner for stoves including a burner pan having one end wall thereof perforated while the adjacent ends of the side walls are formed with extensions, a generator pipe connecting the extensions and arranged opposite the perforations of the end wall, a trough disposed under the generator pipe to receive combustible material when starting the burner, an air mixing tube extending along one side of the pan and having the discharge end thereof in communication with the interior of the pan while the inlet end thereof opens upon the exterior of the pan, a nozzle connected to the generator pipe and arranged to discharge a jet into the air mixing tube, and guard walls protecting the jet and inlet end of the air mixing tube from the flame of the burner.

5. A kerosene burner for stoves including a burner pan having one end wall thereof perforated and the adjacent ends of the side walls formed with extensions, one of the side walls including longitudinally offset end portions, an air mixing tube extending along one side of the pan and connecting the offset end portions of the side wall so that the discharge end of the air mixing tube communicates with the interior of the pan while the inlet end thereof opens upon the exterior of the pan, the perforated end wall of the pan being formed with an extension provided with a nozzle receiving opening and arranged opposite the inlet end of the air mixing tube, a generator pipe connecting the before mentioned side extensions and arranged opposite the perforations of the end wall, a nozzle connected to the generator pipe and passing through the opening of the end wall extension so as to discharge a jet into the inlet opening of the air mixing tube, and a guard wall connecting the upper edge of the end wall extension to the top of the inlet end of the air mixing tube and the upper edge of the adjacent side wall section so as to shield the discharge end of the nozzle and the inlet end of the air mixing tube from the flame of the burner.

6. A kerosene burner for stoves including a burner pan having one end wall thereof perforated and the adjacent ends of the side walls formed with extensions, one of the side walls including longitudinally offset end portions and the center of the burner pan being provided with a draft opening surrounded by an upstanding peripheral flange, an air mixing tube extending along one side of the pan and connecting the opposite end portions of the side walls so that the discharge end of the air mixing tube communicates with the interior of the pan, while the inlet end thereof opens upon the exterior of the pan, the perforated end wall of the pan being formed with an extension provided with a nozzle receiving opening and arranged opposite the inlet end of the air mixing tube, a generator pipe connecting the before mentioned side extensions and arranged opposite the perforations in the end wall, a nozzle connected to the generator pipe and passing through the opening of the end wall extension so as to discharge a jet into the inlet opening of the air mixing tube, and a guard wall connecting the upper edge of the end wall extension to the top of the inlet end of the air mixing tube and the upper end of the adjacent side wall section so as to shield the discharge end of the nozzle and the inlet end of the air mixing tube from the flame of the burner.

In testimony whereof I affix my signature in presence of two witnesses.

FLOYD J. JOHNSON.

Witnesses:
M. G. WHITNEY,
ANNA J. MARK.

Copies of this patent may be obtained for five cents each, by addressing the "Commissioner of Patents. Washington, D. C."